Dec. 15, 1970     R. J. MACK     3,546,944

FLUID PRESSURE INDICATOR

Filed June 3, 1969     2 Sheets-Sheet 1

Inventor:
Robert J. Mack
By: James I. Fawcett
Atty.

Dec. 15, 1970  R. J. MACK  3,546,944
FLUID PRESSURE INDICATOR
Filed June 3, 1969  2 Sheets-Sheet 2
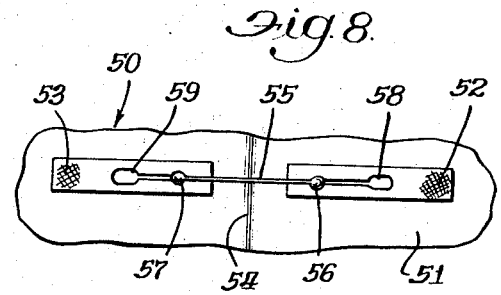
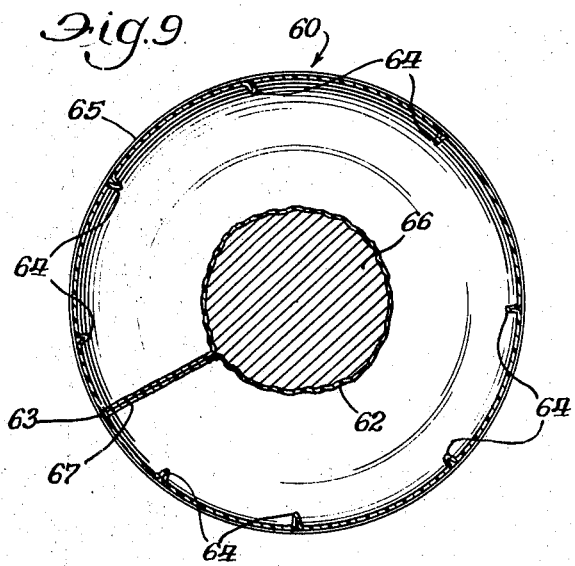
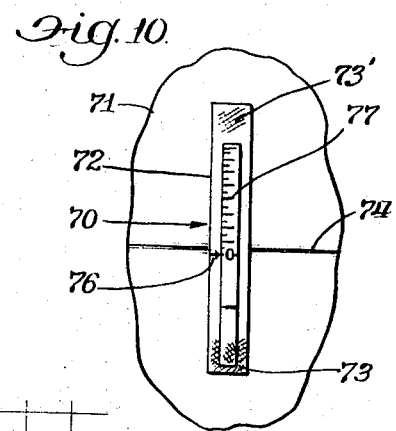
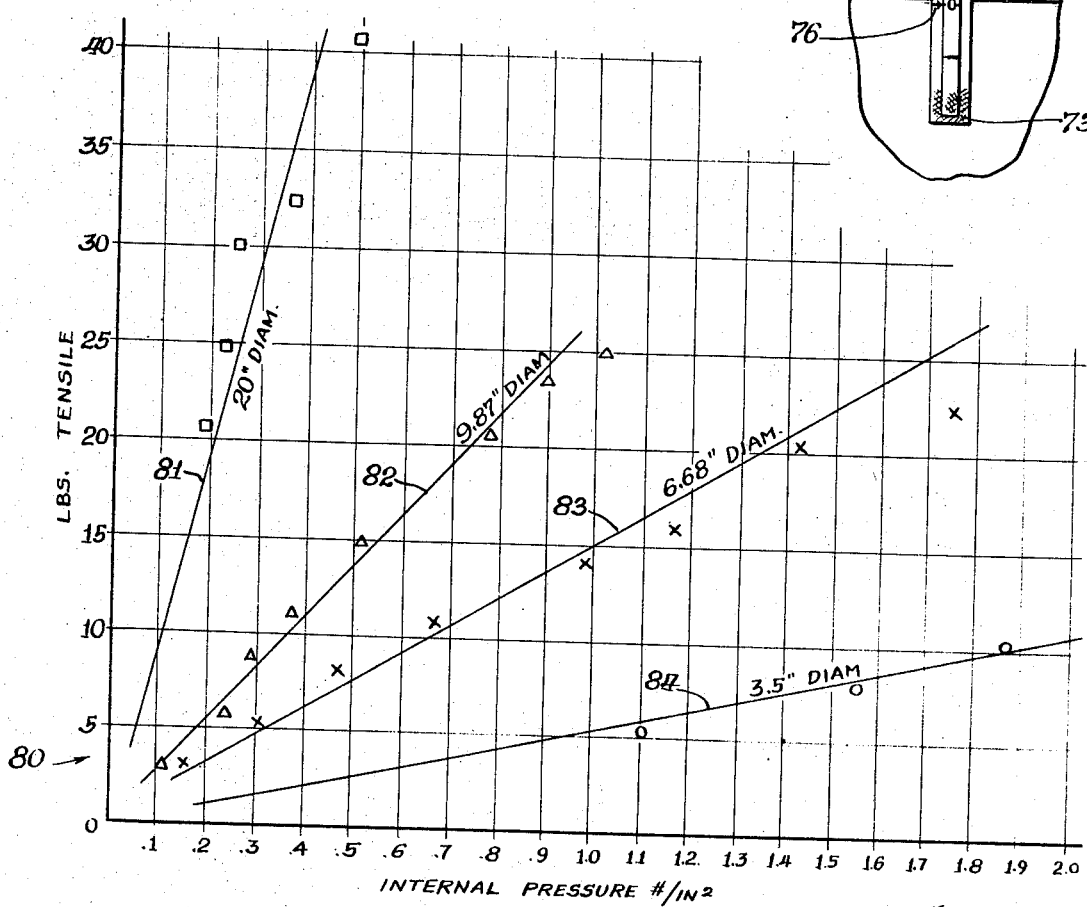
Fig. 11
Inventor:
Robert J. Mack
By James T. Fawcett
Atty.

United States Patent Office 3,546,944
Patented Dec. 15, 1970

3,546,944
FLUID PRESSURE INDICATOR
Robert J. Mack, Palatine, Ill., assignor to The Kendall Company, Walpole, Mass., a corporation of Massachusetts
Filed June 3, 1969, Ser. No. 829,941
Int. Cl. A61f 5/04; G01l 7/02
U.S. Cl. 73—388
10 Claims

ABSTRACT OF THE DISCLOSURE

Devices are disclosed presenting visible and audible indications of attainment of selected internal pressures in a pressure container which includes a flexible thin walled inflatable area. Portions of the inflatable area are restrained from distension by a simple band or cord spanning one or more folds in the wall of the inflatable area. The indication in the case of extensible bands or cords is continuous and visible only, whereas in the case of substantially non-extensible bands or cords, is both visible and audible, such non-extensible bands being either single use or readily renewable in a choice of breaking strengths correlated to internal pressure of the pressure container. Rupture of the band or cord causes an audible pop partly due to instantaneous distension of the folded portion of the inflatable area and partly due to the rupture of the band or cord. The devices have a particular application to the field of double walled inflatable immobilization splints used in first aid treatment of sprains and fractures, and for control of internal and external bleeding, including arterial bleeding.

---

This invention is concerned with devices for indicating internal fluid pressures in a container having a flexible inflatable portion, such as a pneumatic splint.

BACKGROUND OF THE INVENTION

Prior to this invention, fluid pressure measuring devices, sometimes more accurate than the circumstances would seem to require, were bulky and usually involved an intricate assemblage of valves, valve stems, seats, springs and other delicate appurtenances, many of which were of metal with a tendency to stick or corrode. In addition, most of these devices required that the fluid being measured be in contact with an outside measuring device. The opening permitting this contact, obviously, was a potential source of pressure loss through leaks.

SUMMARY

Embodiments of this invention of major importance are concerned with devices for indicating one or more pressure levels during inflation of double walled flexible inflatable splints which are utilized for immobilization of body members and for control of external and internal bleeding, including arterial bleeding. It is highly desirable that internal pressure within inflated immobilization splints be confined to pressures below sixty pounds per square inch for most immobilizations. Many practitioners prefer that the pressure be less than forty pounds per square inch. Where the inflatable sprint is utilized for control of arterial bleeding, however, considerably higher pressures may be prescribed for relatively short periods. The invention is applicable, however, to other fluid containers which include a thin walled hollow portion inflatable by internal pressure.

The primary objective of this invention is the provision of a very simple but practically accurate device for indicating the attainment of a preselected pressure in a container during inflation of an inflatable flexible thin walled hollow portion thereof.

Another object of the invention is the provision of a very simple device which signals when preselected internal pressures are attained during inflation of a flexible thin walled hollow portion of a pressure container.

Another object of the invention is the provision of a simple device with parts which can be replaced or interchanged to make the device repeatedly operative to indicate a wide range of respective internal pressures within a container having a flexible thin walled hollow portion during inflation of the latter.

Another object of the invention is the provision of a device which signals both audibly and visually when a preselected internal pressure has been attained during inflation of the flexible thin walled hollow portion of a fluid container.

The primary object of this invention is achieved by securing a band or cord across one or more folds in an inflatable portion of a pressure container for fluids so that as the fold tends to smooth out, the band or cord is placed under tension, the breaking point of the band or cord being chosen to occur when the pressure inside the inflatable portion reaches a preselected point. Elastic bands or cords, although less preferred, may be utilized to measure the pressure continuously by the amount they stretch.

BRIEF DESCRIPTION OF THE DRAWINGS

FIG. 8 illustrates a device functionally very similar to that of FIG. 6 but using a cord as the pressure indicating member.

FIG. 9 illustrates a cross section of an inflated splint in which the pressure indicating member completely encircles the splint creating a plurality of folds.

FIG. 10 illustrates an alternative device of the invention which includes an elastic pressure indicating member whose degree of stretch indicates internal pressure in the inflatable container.

FIG. 11 is a graph indicating the relationship of tensile strength of the signal means strip and the internal pressure in various double walled splints.

FIG. 1 illustrates in cross section a flexible thin walled hollow inflated container 10 in the form of a double walled immobilization splint having an outer tubular wall 11 and an inner tubular wall 12 shown in place on a body member 16. The inner and outer sleeve-like walls preferably are joined along one or more longitudinal seams such as 13 but the sleeves may be joined at intervals or completely unconnected except at their ends. Where seaming is utilized in forming the sleeves at their ends and optionally longitudinally heat sealing is the preferred method but any method which produces leak free seals at the ends is satisfactory. A fluid pressure signal device 15 is shown in place spanning a fold 14 in the outer wall 11. The inner wall 12 conforms itself around the body member 16 as the splint is inflated. Where there is no longitudinal seam such as 13, the excess inner wall area forms itself into wrinkles and folds around the body member, but when there are one or more longitudinal seams similar to 13, the excess inner wall material forms itself into one or more double walled partitions 17 each extending from the body member to a seam. Under optimum conditions the inner wall would have just enough excess material to form complete partitions to each seam but it is preferred that a few wrinkles form around the body member than that the body member be pulled out of the center of the splint (in single longitudinal seam construction) or that areas exist wherein adjacent the body member the two walls of the partitions are not in contact (where the inner wall is deficient in material and splint construction involves multiple longitudinal seams).

FIG. 2 illustrates a portion of the outer wall and plan view of the signal means 15 of FIG. 1 as it appears in place spanning the fold 14 of the outer tubular wall 11. The roughly dumbbell shape of the signal means with a relatively narrow neck 18 joining two larger areas has some advantage where pressure sensitive adhesive is used to fasten the signal means 15 to the outer wall. The narrowness of the neck depends, of course, on the material of which the means is made and its thickness. The neck 18 is designed to break under a given tensile stress which is correlated to the pressure desired in the inflated body. The breaking of the neck in that case gives a visible and audible signal that the desired pressure has been attained in the inflated body.

FIG. 3 illustrates a variation of the signal means of FIGS. 1 and 2. In this instance, the signal means 35 has its respective ends 33 and 33' heat-sealed to separated places of the outer wall portion 31 of an inflatable body 30 so as to form a fold 34 when the body is inflated as shown, the signal means spanning the fold. The signal means in this instance is rectangular and the width of the neck 32, there being no advantage in a dumbbell shape.

FIG. 4 illustrates a variation in the application of the signal means 25 which is applied to an inflated splint 20 on the inside surface of the outer wall 21 during the manufacture and spans an external fold 24. As shown, the splint is applied over the body member 26 and then inflated. The inner tube 22 is heat sealed to the outer tube 21 along the longitudinal seam 23. During inflation the double wall partition 27 is formed.

FIGS. 5 and 6 illustrate a more elaborate embodiment of the heat-sealed signal device shown in FIG. 3. The inflated body 40 has separated permanent slotted straps 42 and 43 heat-sealed at their ends to the outer wall 41 of the container 40. A pressure indicating strip 45 which may be selected with various width necks 49 so as to break at one of several inflation pressures is removably fastened to straps 42 and 43 through insertion through their respective slots 48 and 49' of retaining lugs 46 and 47 which are preferably integral but of thickened or reinforced construction to render them relatively rigid against deformation caused by longitudinal stresses on the indicating strip 45 during inflation as the strip spans the fold 44 in the outer wall 41.

FIG. 7 illustrates in cross section the appearance of the inflated body 10 and the outer wall 11 of FIGS. 1 and 2 when the signal device 15 breaks, indicating the desired pressure has been attained within the container.

FIG. 8 illustrates in plan view another signal means embodiment very similar to that illustrated in FIGS. 5 and 6. In this embodiment the outer wall 51 of the inflated container 50, a portion of which is shown, has heat-sealed to it, straps 52 and 53 pierced by respective slots 58 and 59. The strip 45 of FIGS. 5 and 6 is replaced by a cord 55 whose beaded ends 56 and 57 are held in spanning relationship across the fold 54 in the outer wall. Obviously, the cord may be selected with various tensile strengths so as to indicate upon breaking that any one of a number of internal pressures had been reached in the inflated container. The devices of FIG. 8 and of FIGS. 5 and 6 lend themselves to almost instant adjustment to indicate a variety of pressures both audibly and visibly. These are the preferred embodiments of the invention.

FIG. 9 illustrates a further embodiment of the invention shown in cross section. The inflated container 60 is a typical double walled immobilization splint with a longitudinal seam 63, shown inflated about the body member 66. An endless band or cord 65 having a preselected breaking point encircles the splint causing one or more folds 64 when the splint is inflated as shown. A typical double walled partition 67 is formed of the excess material of the inner tubular wall 62.

FIG. 10 is a less desirable but still useful embodiment of the invention. The signal device 70 includes an elastic band 72 heat-sealed at its ends 73 and 73' to span the fold 74 in the outer wall of the body 71. As the inflatable container 71 is inflated, band 72 is stretched, the arrow 76 thereon moving relatively along the non-elastic scale 77. The latter is heat-sealed only to the end 73 of the device. The scale is calibrated to indicate pressure inside the particular inflatable container.

FIG. 11 illustrates the relationship of the tensile strength in pounds of the signal means strip and the internal pressure in pounds per square inch for cylindrical double walled splints 81, 82, 83 and 84 of substantially non-elastic film when the splints measured respectively 20 inches, 9.87 inches, 6.68 inches and 3.5 inches in diameter. Obviously, if other splint diameters are to be utilized, the relationship for the diameter selected can be calibrated. A splint 10 inches in diameter is useful for arm and leg splints, the length being selected depending upon the area to be immobilized. Large splints may be utilized for body immobilization.

Figure 1:
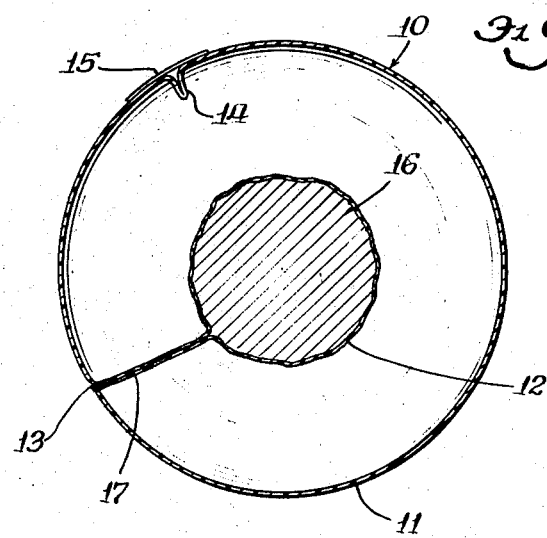
FIG. 1 illustrates in cross section a double walled inflated immobilization splint with an external device of the invention in place.
Figure 2:
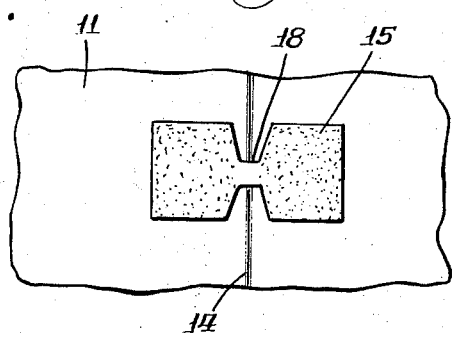
FIG. 2 illustrates a plan view of the device of FIG. 1.
Figure 3:
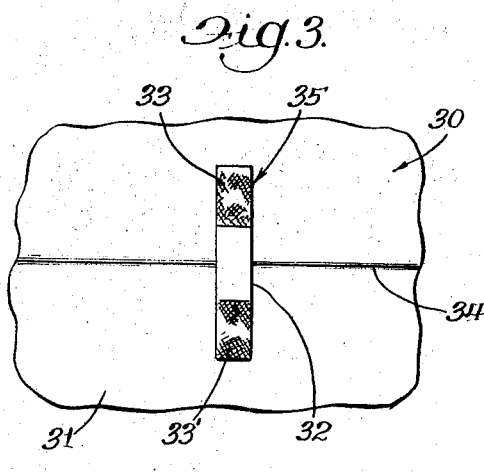
FIG. 3 illustrates an alternative device of the invention.
Figure 4:
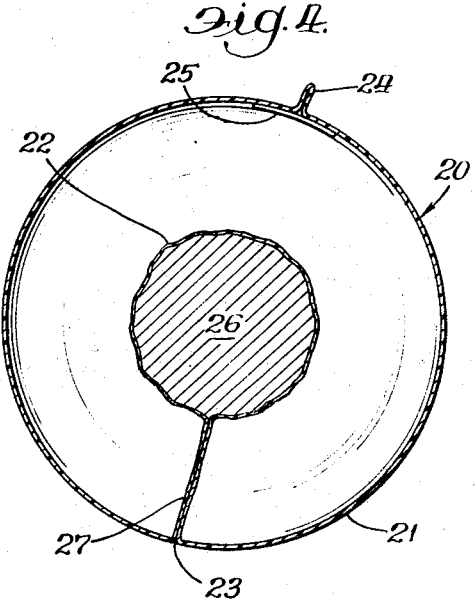
FIG. 4 illustrates an internal device of the invention in place on an inflated splint.
Figure 5:
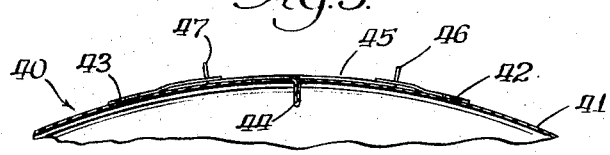
FIGS. 5 and 6 show an alternative device with replaceable pressure indicating strips.
Figure 6:
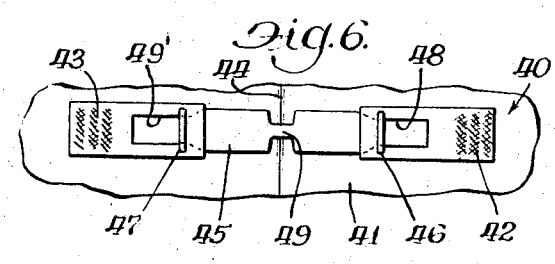
Figure 7:
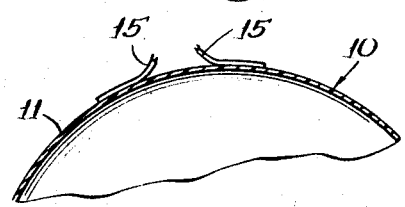
FIG. 7 illustrates the appearance of the splint in FIG. 1 after the pressure indicating member has ruptured.

In the drawings and specification there have been set forth preferred embodiments of the invention and, although specific terms are employed, they are used in an exemplary descriptive sense only and are not to be interpreted in any sense as limitations, the scope of the invention being defined in the claims.

I claim:

1. A device for measuring internal fluid pressures comprising signal means actuated by fluid pressure in a fluid-retentive container having an inflatable portion which under pressure tends to present a convex curvilinear outer surface, said signal means including a member correlated to restrict said curvilinear surface whereby during inflation of said inflatable portion tension is placed on said member, said signal means, during said inflation, being activated to indicate attainment of at least one preselected fluid pressure internally of said container.

2. The device of claim 1 wherein said member of said signal means is an extensible member whose degree of elongation indicates the fluid pressure within said container for a plurality of selected values.

3. The device of claim 1 wherein said signal means is secured to said container at two separated points with said member spanning at least one fold in said inflatable portion.

4. The device of claim 1 wherein said member of said signal means has a known breaking point and wherein breakage of said member during inflation of said container indicates the fluid pressure within said container has reached a preselected value.

5. The device of claim 4 wherein said member is a cord-like member.

6. The device of claim 4 wherein said signal means is affixed to the inflatable portion by sealing means.

7. The device of claim 4 wherein said signal means is a pressure-sensitive adhesive tape.

8. The device of claim 4 wherein said member having a known breaking point is mechanically interlocked with tabular portions permanently attached to said inflatable portion.

9. The device of claim 4 wherein the member is positioned internally of said inflatable portion.

10. The device of claim 4 wherein the convex curvilinear outer surface is cylindrical and the signal means is an annular band encircling said cylindrical surface.

References Cited

UNITED STATES PATENTS

| | | | |
|---|---|---|---|
| 2,020,526 | 11/1935 | Stahl | 73—338X |
| 2,679,228 | 5/1954 | Gryce | 116—114 |
| 3,237,590 | 3/1966 | Black et al. | 116—114 |

FOREIGN PATENTS

| | | | |
|---|---|---|---|
| 845,127 | 7/1952 | Germany | 116—114 |

LOUIS R. PRINCE, Primary Examiner

J. W. ROSKOS, Assistant Examiner

U.S. Cl. X.R.

116—114; 128—90